Jan. 11, 1972   L. E. HIMELREICH, JR., ET AL   3,634,570
ELASTOMER GRANULATION PROCESS
Filed Oct. 20, 1969   2 Sheets-Sheet 1

INVENTORS
LOUIS E. HIMELREICH, JR.
NELSON A. THOMAS,

ATTORNEY

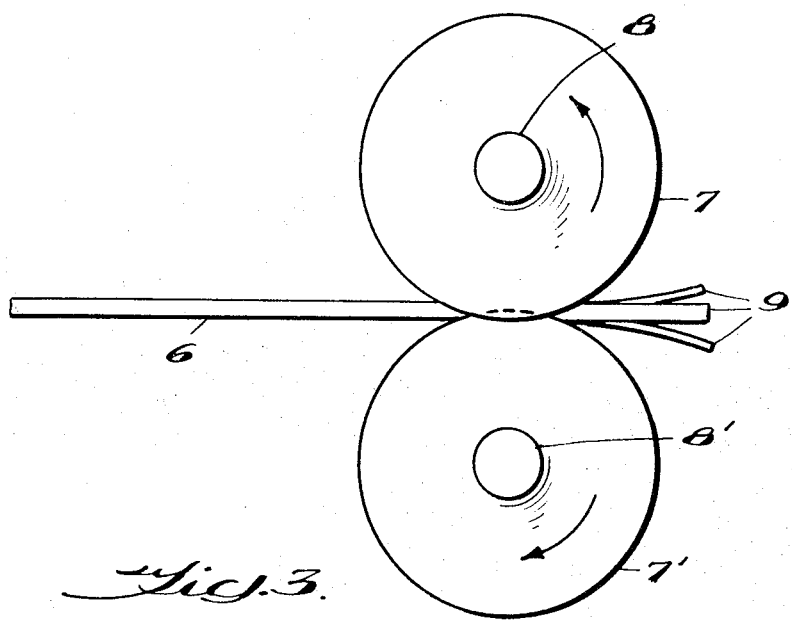
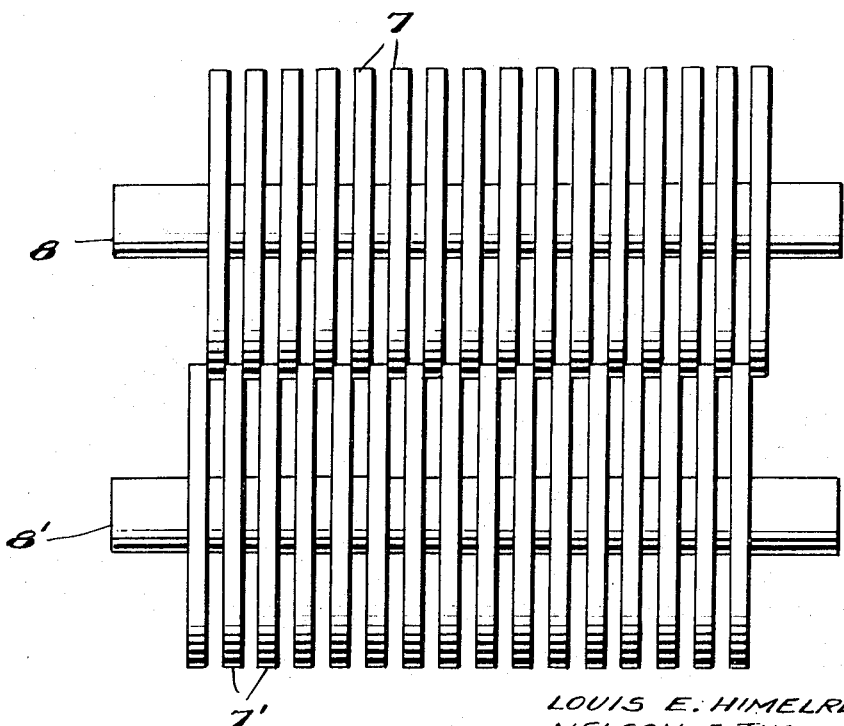

United States Patent Office 3,634,570
Patented Jan. 11, 1972

3,634,570
ELASTOMER GRANULATION PROCESS
Louis Eugene Himelreich, Jr., and Nelson Arnold Thomas, Louisville, Ky., assignors to E. I. du Pont de Nemours and Company, Wilmington, Del.
Filed Oct. 20, 1969, Ser. No. 867,810
Int. Cl. B02c *18/06*
U.S. Cl. 264—130                     6 Claims

ABSTRACT OF THE DISCLOSURE

An improved process for the manufacture of granular neoprene comprising the steps of simultaneously lubricating and slicing a unitary strand of neoprene longitudinally into a plurality of continuous filaments, maintaining the filaments in spaced relation to each other, continuously cross-cutting the filaments to form granular particles, dusting the granular particles with talc or a talc containing mixture, and collecting the granular particles.

BACKGROUND OF THE INVENTION

This invention pertains to a process for the manufacture of granular material by feeding work to a cutter, longitudinally cutting a continuous strip of the material along a line generally parallel to the direction of work feed, followed by transverse cutting of the material to separate each piece from the advancing edge of the work.

Methods for manufacturing neoprene sheets are well known in the art. In U.S. 2,914,497 (col. 5) a process for isolating neoprene from an aqueous dispersion of the polymer by use of a drum dryer is described. This patent (col. 1) also describes a freeze-roll isolation procedure. U.S. 2,187,146 describes a process for freeze-roll isolation in detail. U.S. 2,349,829 illustrates use of gathering and forming rolls for converting neoprene sheet into a compressed unitary strand or rope.

Granulated neoprene can be manufactured by cutting a neoprene rope into a number of small segments as described in U.S. 2,349,829. These small pieces of neoprene are then fed to a granulator where they are further reduced in size. The granulator consists of a series of rotating cutting blades and a fixed bed knife. By the continuous action of the cutting blades, the neoprene is reduced in size until it passes through a screen of desired mesh at the bottom of the granulator.

Granulation processes currently used have several disadvantages. First, the capacity of commercial granulators is too low to permit continuous production of granulated neoprene at economical production rates. Second, continuous action of the cutting blades on the neoprene increases the temperature of the neoprene making it tacky and resulting in neoprene particles frequently sticking together. Third, the granulator must be cooled by means of water. Fourth, when talc is used in the granulator to prevent sticking of the neoprene particles, the milling action of the cutter blades forces the talc into the neoprene particles resulting in increased consumption of talc and contamination of the neoprene.

The process of this invention is suitable for making granules of relatively small size which can be more easily dissolved in a solvent. The process is especially useful for making small neoprene particles, which when dissolved in a suitable solvent are useful as an adhesive.

SUMMARY OF THE INVENTION

According to this invention there is provided an improved process for the manufacture of a granular elastomer comprising the steps of preparing an aqueous dispersion of the elastomer, coagulating the dispersion to form a thin film of the elastomer, drying the film, cooling the film to a temperature of about 10° to 40° C., gathering the film into a rope of substantially rectangular cross-section, wherein the improvement consists essentially of slicing the rope longitudinally into a plurality of continuous filaments by means of mating circular slitter blades lubricated with water, maintaining the filaments in spaced relation to each other, feeding the filaments through coacting feed rolls to a chopper, continuously cross-cutting the filaments to form granular particles, dusting the granular particles with talc or a talc containing mixture, and collecting the granular particles.

As used herein, the term "rope" is used to refer to a continuous slab or thick unitary strand, the dimensions of which are specified hereinafter.

BRIEF DESCRIPTION OF THE DRAWINGS

FIG. 2 is an elevation of the mating circular slitter blades.

FIG. 3 is a front view of the mating circular slitter blades.

DESCRIPTION OF THE INVENTION

The first step in the process for manufacturing neoprene granules is the preparation of an aqueous dispersion of an elastomer followed by coagulation of the dispersion to form a neoprene sheet by means of freeze-roll isolation or drum drying. As previously mentioned, these steps in the process are well known in the art. Once the neoprene sheet has been prepared, the material can be passed through conventional film dryers to remove excess water.

The dried neoprene sheet is then passed over a cooling roll to control the temperature of the neoprene to about 10°–40° C. Temperature control at this stage of the process is important because at these low temperatures neoprene is less tacky, more rigid and easier to handle during processing than at higher temperatures. The preferred temperature is 20° C. Cooling of the neoprene sheet to the desired operating temperature is accomplished by passing the sheet over a brine-chilled cooling roll. Other methods of cooling the neoprene sheet may be used.

The next step in the process is to pass the neoprene sheet through gathering rolls of the type described in U.S. 2,349,829. This stage in the process is essential since it is not possible to slice and chop sheets of neoprene. The material must be formed into a rope, filament, or sliver-like material. Neoprene at this stage of the process is tacky and neoprene sheet material tends to curl at the edges, fold back and stick on itself. This produces an irregular work piece unsuitable for slicing into filaments.

Figure 1:
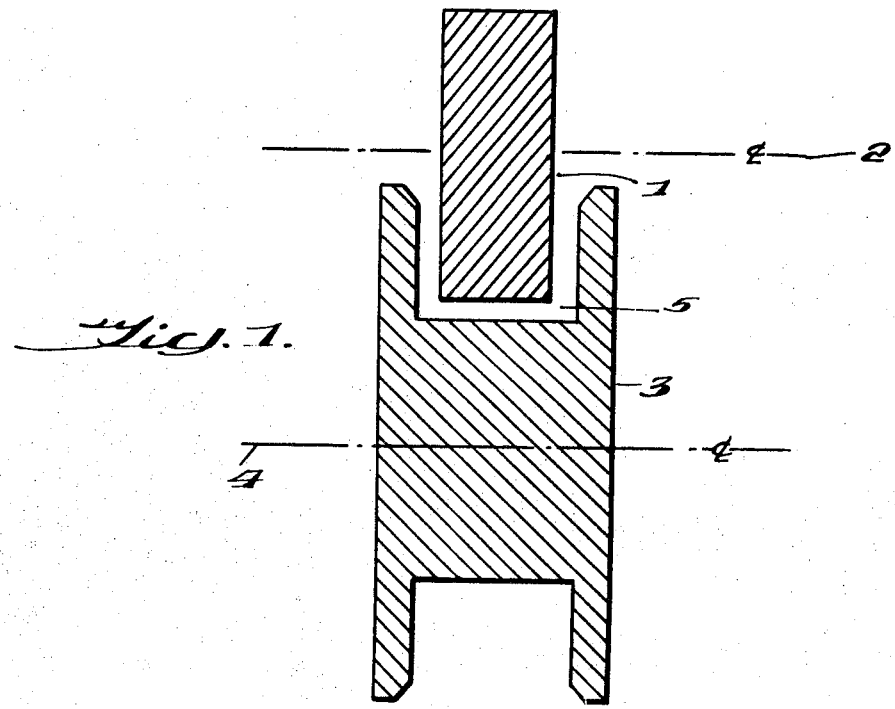
FIG. 1 is a cross-section of the male-female forming rolls in which the neoprene is formed into a rope of substantially rectangular cross-section.

The neoprene is then passed through male-female forming rolls, upon which water is sprayed for cooling and lubrication. Referring to FIG. 1, the male forming roll 1 rotates about axis 2 while female forming roll 3 rotates about axis 4. The neoprene passes through opening 5 and is formed into a rectangular body of substantially uniform cross-section. The thickness of the neoprene rope formed by passing through the male-female forming rolls is determined by the distance between the rolls. This dimension varies between 1/32 of an inch and one inch with the preferred dimensions being between 1/4 to 3/8 inch. The width of the neoprene rope is determined by the dimensions of the forming rolls. The preferred width of the neoprene rope is between 3/4 inch and 3 inches. The clearance between the sides of the male and female forming rolls is about 10–20 mils. The process is operable with ropes having uniform cross-sections other than rectangular, however, rectangular is preferred. A rope of circular cross-section, for example, would result in irregular filaments after the slitting process.

The next step in the process is to pass the neoprene rope through mating circular slitter blades. A side view of these blades is shown in FIG. 2. The neoprene rope 6 enters slitter 7 rotating about axis 8 which co-acts with slitter 7' rotating about axis 8'. Filaments 9 exit from the slitter apparatus.

FIG. 3 is a front view of the mating slitter blades. It is apparent from FIGS. 2 and 3 that the neoprene rope 6 is slit by the blades into a number of divided filaments 9. The width of these filaments 9 depends on the width of the mating circular slitter blades and preferably is between 1/16 inch and 1/2 inch. It is essential at this stage of the process that the slitter blade apparatus be wet with water or other suitable liquid to lubricate the system, prevent the neoprene from sticking to the slitter blades, and to cool the neoprene to control tack. The temperature is preferably maintained below about 20° C. Neoprene rope is fed to the slitter apparatus at a rate of about 100–200 feet per minute, but these feed rates are not critical for operation of the process. The rate is dictated by the output of the drum dryer or freeze-roll isolation process and the rate of production of the rope. This permits continuous production of granulated neoprene. The maximum number of ropes which can be fed to the slitter apparatus is determined by the capacity of the slitter. As many as eight ropes are operable.

Figure 4:
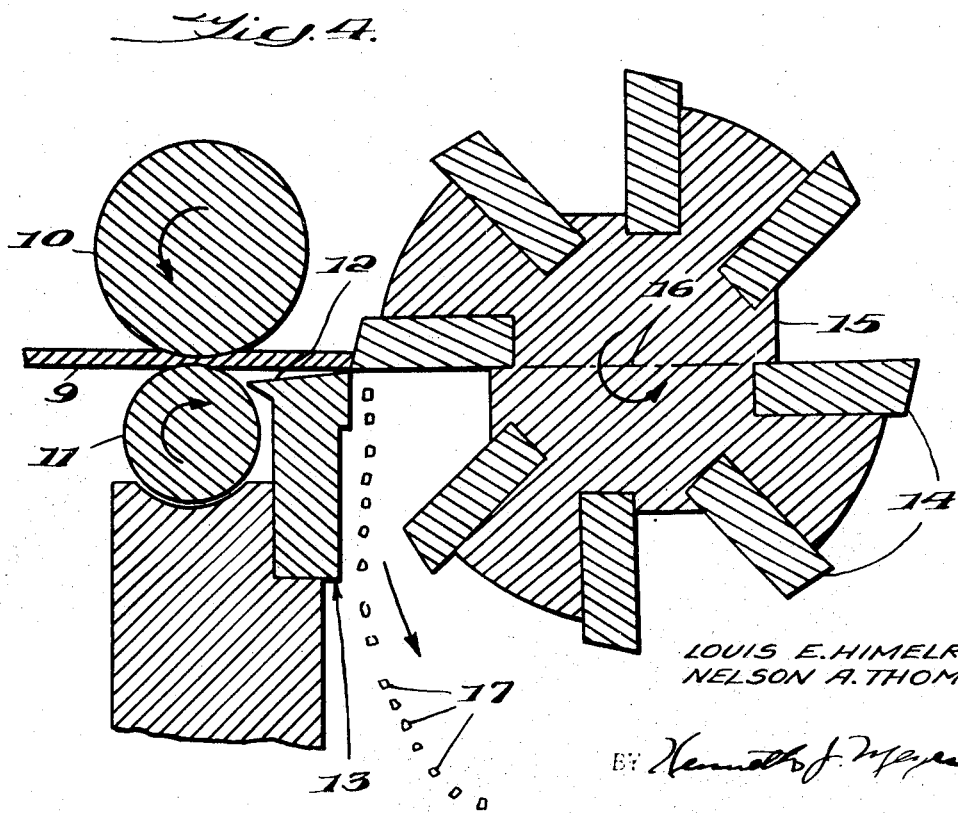
FIG. 4 is a cross-section of the feed rolls and rotary cutter.

The neoprene filaments 9 then pass through a rotary cutter. FIG. 4 shows a cross-section of the rotary cutter. The filaments 9 pass through co-acting feed rolls 10 and 11 across the upper surface 12 of bed knife 13. Cutting blades 14 are mounted on a body 15 which rotates about axis 16. Neoprene filaments 9 are chopped into small granules as the rotating knives 14 pass bed knife 13. The neoprene granules 17 exit from the cutter are dusted with talc, and collected.

The size of the neoprene granules is regulated by the speed of the rotating cutter blades and the rate at which the neoprene filaments are fed to the cutter. The length of the granules are usually between 1/16 inch and one inch. The preferred dimensions for neoprene granules are about 3/8 inch wide by 3/16 inch thick by 1/8 inch long. Occasionally, pieces larger than one inch pass through the cutting machine.

The maximum number of filaments which can be fed to the chopper is limited only by the number of formed ropes that can be fed to the slitter blades and the capacity of the cutter. The minimum number of filaments that can be fed to the chopper is one. The preferred number of filaments is about 3–50.

The feed of the slit neoprene filaments into the rotating cutting blades is regulated by means of a set of feed rolls 10 and 11. The diameter of these rolls is preferably about 1½–2½ inches. Neoprene rubber at this stage of the process is a soft pliable material and is not readily pushed from the slitter to the chopper. Consequently, the tangential speed of the feed rolls is slightly greater than the linear speed of the neoprene filaments. This differential in rates results in the feed rolls pulling the slit neoprene filaments out of the slitter blades, thereby keeping the slitter blades free of the neoprene filaments. The tangential speed of the feed rolls is about 2–5% greater than the tangential speed of the slitter blades. It is thus necessary to push the neoprene filaments only a distance of about 3/4 inch over the top 12 of stationary bed knife 13. The pulling action of the rotating feed rolls prevents plugging of the circular slitter blades while maintaining the neoprene filaments in spaced relation to each other. The surface of the feed rolls may be smooth, grooved or serrated.

The neoprene granules 17 are dusted with talc or a talc containing mixture as they exit the chopper and are then collected. The talc prevents the neoprene granules from sticking together and is applied in dry powder form. A talc-containing mixture which may be used is dry ground calcium carbonate which is surface treated by exposure to stearic acid vapors, and as a result contains 1 to 2% calcium stearate.

A minimum amount of talc should be used because of its effect on the cost of the final product. Small amounts are also desirable because when the neoprene granules are dissolved in solvent the talc must be removed from the solution if it is to be used as an adhesive. Less than 2% talc or talc containing mixture based on the weight of neoprene is acceptable. However, with this process the percentage of 1% or less can be attained while preventing the neoprene granules from sticking together. The single pass of the neoprene granules through the chopper followed by the application of talc does not lead to milling of the talc into the neoprene.

The process of this invention is particularly useful for the manufacture of granulated neoprene. This includes all types of neoprene used as adhesives. The process may also be used with other elastomers and polymers.

There are several advantages to this improved process for the granulation of neoprene. First, the prior art method requires several passes of the neoprene around the granulator until the particles are reduced in size sufficient to pass through the screening device at the bottom of the granulator. This results in low production rates because of the limited throughput of commercial granulators, the consumption of larger amounts of talc, and a higher temperature of operation frequently resulting in agglomeration of the particles thus formed. Second, the prior art method is not a continuous in-line process because of the low capacity of commercially available granulators. This process provides for the continuous in-line production of neoprene granules at higher production rates. It also results in the consumption of less talc and reduced labor costs because of the continuous operation of the process. A lower temperature of operation avoids sticking and solidification of neoprene granules. This lower temperature without special cooling means is due to the single pass through the chopper as opposed to multiple passes around prior art granulators which increases the temperature of the neoprene granules making them stickier.

The following example illustrates the operation of the process of this invention.

EXAMPLE

Dry neoprene film, 5 to 10 mils thick of the type given in Example 1 of U.S. 3,326,824 is obtained by freeze-roll isolation (as described in the second paragraph of U.S. 2,914,497) and drying in air at about 140° C. It is cooled to about 25° C. by traveling over a brine-chilled cooling roll at about 120 ft./min., is looped around a gathering roll, (as in FIG. 1 of U.S. 2,349,829) and is pulled into a set of male-female forming rolls. Water is sprayed onto the forming rolls at approximately one gallon per hour to provide lubrication and cooling. The resultant rope is of substantially rectangular cross-section having dimensions of 0.38 inch by 1.50 inches.

The compressed rectangular rope is passed through a set of steel mating circular slitter blades having a tolerance between mating surfaces of not over .0005 inch and a diameter of about 6 inches and a width of about 1/8 inch. These blades are lubricated by a spray of about two gallons of water per hour. The rope is thereby slit into filaments. Slit filaments of neoprene are fed by means of two serrated feed rolls to a rotary cutter (chopper) having 8 blades, 14 inches long traveling in an 8 inch diameter circle at about 1000 r.p.m. and cutting against a single bed knife. The neoprene is cut into rectangular granules having an average dimension of about 0.20 inch by 0.18 inch by 0.38 inch. The cut granules fall into a chute in which talc is added by a screw feeder at a rate of about 0.03 pound talc per pound of neoprene.

What is claimed is:

1. In a process for the manufacture of a granular neoprene comprising the steps of preparing an aqueous dispersion of neoprene, coagulating the neoprene to form a thin film of elastomer, drying the film, cooling the film to a temperature of about 10°–40° C., and gathering the film into a rope of substantially rectangular cross-section, wherein the improvement consists essentially of: slicing the rope longitudinally into a plurality of continuous filaments by means of mating circular slitter blades lubricated with water, maintaining the filaments in spaced relation to each other, feeding the filaments to a chopper by means of co-acting feed rolls, continuously cross-cutting the filaments to form granular particles of elastomer, dusting the granular particles with talc or a talc containing mixture and collecting the granular particles, the elastomer being tacky from the step of drying the initial film until dusted with the talc.

2. The improved process of claim 1 wherein the dimensions of the cross-section of the rope are about 1/32 inch to 1 inch thick by about 3/4 inch to 3 inches wide.

3. The improved process of claim 1 wherein the rope is sliced into about 3–50 filaments.

4. The improved process of claim 1 wherein the width of the filaments is about 1/16 inch to 1/2 inch.

5. The improved process of claim 1 wherein the filaments are continuously cross-cut at intervals of about 1/16 inch to 1 inch.

6. The improved process of claim 1 wherein the co-acting feed rolls rotate at a tangential speed about 3–5% greater than the tangential speed of said mating circular slitter blades.

References Cited

UNITED STATES PATENTS

| | | | |
|---|---|---|---|
| 2,739,647 | 3/1956 | Coste | 164—61 |
| 2,975,483 | 3/1961 | Cooper et al. | 264—143 |
| 3,491,177 | 1/1970 | Johnson | 264—144 |
| 3,519,706 | 7/1970 | Pantsios | 264—143 |

ROBERT F. WHITE, Primary Examiner

J. R. HALL, Assistant Examiner

U.S. Cl. X.R.

264—131, 143